United States Patent
Kotaka (10) Patent No.: US 10,628,093 B2
(45) Date of Patent: Apr. 21, 2020

(54) PRINTING SYSTEMS AND METHODS FOR MONITORING PRINT JOBS

(71) Applicant: SEIKO EPSON CORPORATION, Tokyo (JP)

(72) Inventor: Satoshi Kotaka, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/018,365

(22) Filed: Jun. 26, 2018

(65) Prior Publication Data

US 2019/0004747 A1 Jan. 3, 2019

(30) Foreign Application Priority Data

Jun. 29, 2017 (JP) .................. 2017-127043

(51) Int. Cl.
*G06F 3/12* (2006.01)

(52) U.S. Cl.
CPC .......... *G06F 3/1218* (2013.01); *G06F 3/1259* (2013.01); *G06F 3/1274* (2013.01); *G06F 3/1207* (2013.01)

(58) Field of Classification Search
CPC .................................................... G06F 3/1259
USPC .............................................. 358/1.14, 1.15
See application file for complete search history.

(56) References Cited

U.S. PATENT DOCUMENTS

| 6,600,569 | B1 * | 7/2003 | Osada | ................ | G06F 3/1296 |
| | | | | | 358/1.12 |
| 2004/0218204 | A1 | 11/2004 | Nomura | | |
| 2010/0220354 | A1 * | 9/2010 | Honda | ................ | G06F 3/121 |
| | | | | | 358/1.15 |

FOREIGN PATENT DOCUMENTS

JP      2004-130784 A      4/2004

* cited by examiner

*Primary Examiner* — Jamares Q Washington
(74) *Attorney, Agent, or Firm* — Workman Nydegger (57) ABSTRACT

An information processing apparatus configured to cause a printer to perform a print job includes a driver and a monitoring section. The driver is configured to generate print data of the print job and to transfer the generated print data to the printer. The monitoring section is configured to perform a status acquiring process for acquiring status information of the printer. The monitoring section is configured to perform the status acquiring process over a period from a start of transfer of the print data to an end of transfer of the print data.

8 Claims, 5 Drawing Sheets

PRINTING SYSTEMS AND METHODS FOR MONITORING PRINT JOBS

BACKGROUND

1. Technical Field

The present invention relates to, for example, information processing apparatuses that make print requests to printers and, in particular, to, for example, an information processing apparatus configured to complete a cancellation process of a print job in a short period of time while restraining a communication load.

2. Related Art

While a printer performs a printing process in accordance with a print request made by a host apparatus such as a personal computer, a print job based on the print request may be cancelled.

JP-A-2004-130784 proposes a technique for preventing what is called wasted printing from being performed in such a case. JP-A-2004-130784 discloses that a cancellation request can be made through an operation panel of a printer and that, in the event of cancellation, processes such as sending the cancellation request to a host apparatus and erasing print data are performed.

According to JP-A-2004-130784, by means of a process of acquiring the status information of the printer usually performed by the host apparatus at moderate frequency, the host apparatus detects that the cancellation request has been made in the printer. In this case, a delay in the detection may occur depending on the timing of the acquiring process. Accordingly, the host apparatus may transfer a large amount of data of a cancelled print job to the printer after the cancellation request is made. In recent years, this problem has been notable owing to an improvement in functions of the host apparatus in particular. A large amount of data transferred in this way may cause an operation performed on the printer to take time.

On the other hand, an excessive increase in frequency of the acquiring process of the status information may cause a problem of an increase in a communication load. This problem is more notable particularly in an environment where a large number of host apparatuses are connected to a large number of printers, such as an environment incorporated in offices.

In addition, in the apparatus disclosed in JP-A-2004-130784, print data that is transferred from the host apparatus after the cancellation request is made is saved in a receiver buffer first, as in a normal processing procedure. Next, the apparatus reads and interprets the saved print data. Finally, the apparatus erases the saved print data. Thus, the process described above takes time.

SUMMARY

An advantage of some aspects of the invention is to provide, for example, an information processing apparatus that makes a print request to a printer and that particularly is capable of causing a cancellation process of a print job to be completed in a short period of time while restraining a communication load.

According to a first aspect of the invention, in order to realize the advantage described above, there is provided an information processing apparatus that includes: a transfer section configured to transfer print data of a print job to a printing apparatus; and an acquisition section configured to acquire status information of the printing apparatus. The acquisition section is configured to acquire the status information over a first period from a start of transfer of the print data to an end of transfer of the print data.

In a case where a job cancellation request is made in the printing apparatus, the aspect described above enables the information processing apparatus to promptly detect that the job cancellation request is made and to abort the transfer of the print data with respect to a cancelled print job.

Furthermore, in the first aspect described above, it is preferable that frequency of the acquisition of the status information performed over the first period from the start of transfer of the print data to the end of transfer of the print data be higher than frequency of the acquisition of the status information performed over a second period other than the first period.

The configuration described above facilitates prompt detection that the job cancellation request has been made in the printing apparatus, thereby reducing a transfer amount of the print data with respect to the cancelled print job. Accordingly, it is possible to shorten a period of time required by a cancellation process performed on the printing apparatus. In addition, it is possible to restrain a communication load.

Furthermore, in the first aspect described above, it is preferable that the acquisition section be further configured to acquire the status information over only the first period from the start of transfer of the print data to the end of transfer of the print data.

The configuration described above enables restraining the communication load.

Furthermore, in the first aspect described above, it is preferable that the status information include information on whether or not a job cancellation request is present. In addition, it is preferable that, in a case where the status information includes information that indicates a presence of the job cancellation request, the status information further include information for identifying the print job that is a target of the job cancellation request.

According to the configuration described above, it is possible to correctly detect that cancellation of a print job has been requested and to correctly determine which print job has been cancelled.

Furthermore, in the first aspect described above, it is preferable that the transfer section abort the transfer of the print data at an end of a predetermined piece of data in a case where status information acquired by the acquisition section includes the information that indicates the presence of the job cancellation request.

The configuration described above enables the printing apparatus to erase the print data of the cancelled print job in a short period of time.

Furthermore, in the first aspect described above, it is preferable that the print data include a piece of unit data, the piece of unit data including a header and a piece of subsequent data that follows the header, the header including information on a data size of the piece of subsequent data. In addition, it is preferable that the transfer section be further configured to abort the transfer of the print data at an end of the piece of unit data in a case where status information acquired by the acquisition section includes information that indicates a presence of a job cancellation request.

The configuration described above enables the printing apparatus to erase the print data of the cancelled print job in a short period of time.

According to a second aspect of the invention, in order to realize the advantage described above, there is provided a printing apparatus including a data receiver, an analyzer, and an erasing section. The data receiver is configured to receive, from a host apparatus, a plurality of pieces of divided data into which print data is divided. The plurality of pieces of divided data includes respective headers and pieces of body data. The analyzer is configured to, in a case where a print job is cancelled, analyze headers of pieces of divided data received by the data receiver in order of reception time of the pieces of divided data received by the data receiver. In this analysis, a header of a piece of divided data received first out of the pieces of divided data received by the data receiver is analyzed first. The erasing section is configured to, in a case where a result of the analysis indicates that a piece of divided data corresponds to the print job that is cancelled, erase both a header of the piece of divided data and a piece of data having a size corresponding to a piece of body data. The size is indicated by the header. The erasure of the piece of data is performed with an end of the header as a data erasure starting position and without analysis of the piece of body data to be performed by the analyzer.

The aspect described above shortens the cancellation processing time.

Furthermore, in the second aspect described above, it is preferable that, in a case where communication between the host apparatus and the printing apparatus is cut off after the print job is cancelled and before a printing process of a subsequent job is initiated, the piece of divided data be erased after the piece of body data of the piece of divided data is analyzed even though the piece of divided data corresponds to the print job that is cancelled.

The configuration described above prevents erroneous data deletion that may occur in a case where the communication with the host apparatus is cut off.

According to a third aspect of the invention, in order to realize the advantage described above, there is provided a non-transitory computer-readable storage medium storing a program that causes an information processing apparatus to function as a transfer section and as an acquisition section. The information processing apparatus is configured to cause a printer to perform a print job. The transfer section is configured to transfer print data of a print job to a printing apparatus. The acquisition section is configured to acquire status information of the printing apparatus. The acquisition section is configured to acquire the status information over a first period from a start of transfer of the print data to an end of transfer of the print data.

Furthermore, in the third aspect described above, it is preferable that the program cause the information processing apparatus to further function as a setting section that is capable of setting frequency of the acquisition of the status information performed by the acquisition section. It is preferable that the setting section be configured to be capable of setting frequency of the acquisition of the status information performed over the first period from the start of transfer of the print data to the end of transfer of the print data to be higher than frequency of the acquisition of the status information performed over a second period other than the first period.

Furthermore, in the third aspect described above, it is preferable that the program cause the information processing apparatus to further function as a setting section that is capable of setting a period over which the acquisition section acquires the status information. It is preferable that the setting section be configured to be capable of setting the acquisition section to acquire the status information over only the first period from the start of transfer of the print data to the end of transfer of the print data.

According to a fourth aspect of the invention, in order to realize the advantage described above, there is provided a printing system that includes: an information processing apparatus configured to transfer print data; and a printing apparatus configured to perform printing in accordance with the print data. The print data includes a piece of unit data. The piece of unit data includes a header and a piece of subsequent data that follows the header, the header indicating a data size of the piece of subsequent data. The information processing apparatus is configured to acquire status information of the printing apparatus while transferring the print data and is further configured to abort, in a case where the acquired status information includes information indicating that a job cancellation request has been made, the transfer of the print data at an end of the piece of unit data. The printing apparatus is configured, with respect to part of the print data, the part which the printing apparatus receives from the information processing apparatus after receiving the job cancellation request, to erase a piece of data without interpreting the piece of data, the piece of data following a header included in the part of the print data and having a size indicated in the header.

Additional advantages and features of some aspects of the invention will be clearly described in the following preferred embodiments of the invention.

BRIEF DESCRIPTION OF THE DRAWINGS

The invention will be described with reference to the accompanying drawings, wherein like numbers reference like elements.

DESCRIPTION OF EXEMPLARY EMBODIMENTS

Preferred embodiments of the invention will be described hereinafter with reference to the accompanying drawings. The embodiments, however, should not serve to limit any aspect of the invention. It should be noted that an explanation will be made with the same components or analogous components being denoted by the same reference numerals or the same reference characters in the drawings.

Figure 1:
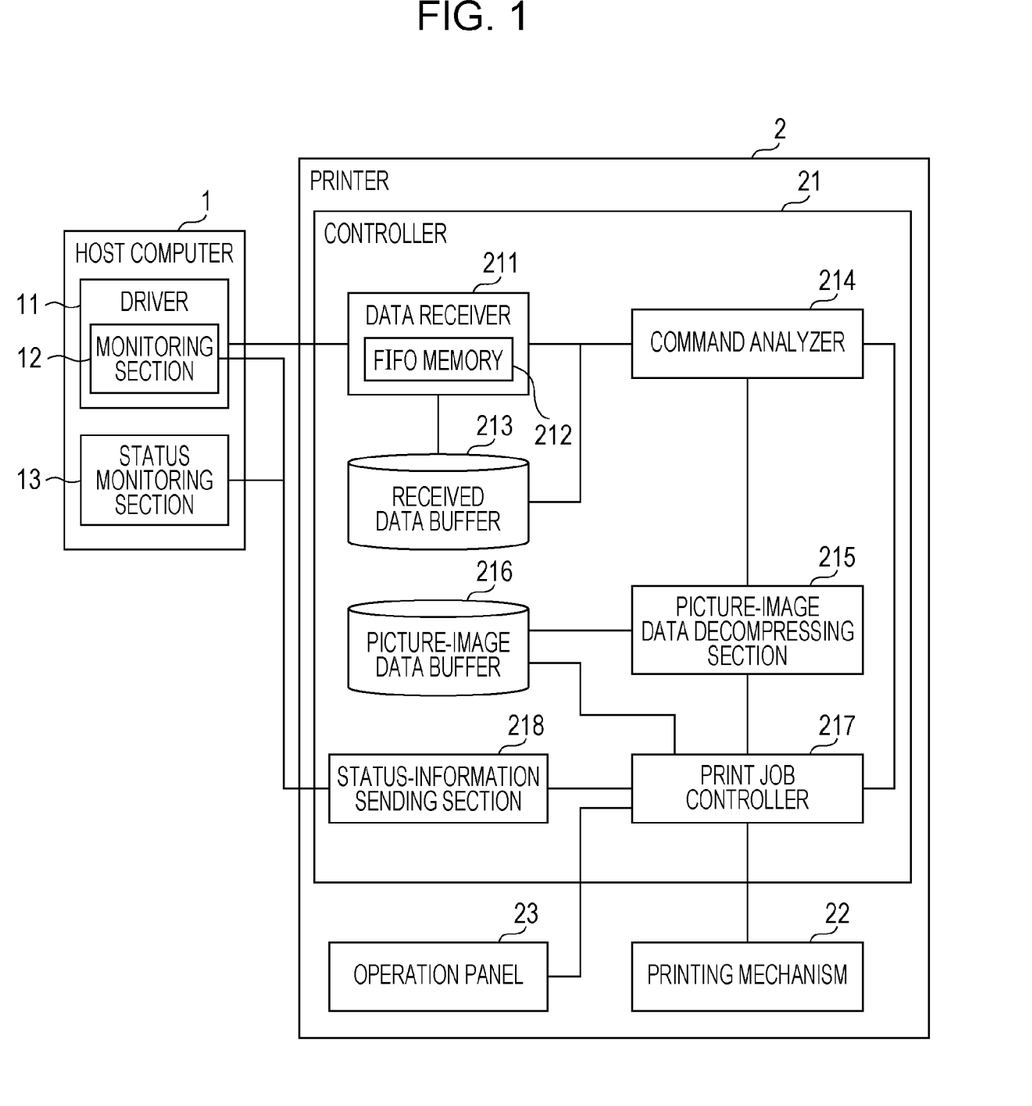
FIG. 1 is a block diagram illustrating a preferred embodiment of a printing system including an information processing apparatus to which the invention is applied.

FIG. 1 is a block diagram illustrating a preferred embodiment of a printing system including an information processing apparatus to which the invention is applied. A host computer 1 and a printer 2 illustrated in FIG. 1 respectively correspond to an information processing apparatus to which the invention is applied and to a printing apparatus. The host computer 1 performs an acquiring process of status information at high frequency over only a period during which a print job that the printer 2 is instructed to perform is being processed. After detecting, by means of the acquiring process, that cancellation of the print job has been requested in the printer 2, the host computer 1 aborts transfer of print data at the end of a piece of data having a predetermined data size indicated in a header. In addition, with respect to part of the print data which part the printer 2 receives from the host computer 1 after the cancellation is requested, the printer 2 interprets a header included in the part of the print data to thereby obtain a data size of a piece of subsequent image data that follows the header. Next, the printer 2 erases a piece of data that follows the header and that has the data size, without interpreting the piece of data. In the printing system including the host computer 1 and the printer 2 according to the embodiment, the processes described above enable prompt completion of a cancellation process for preventing what is called wasted printing while restraining a communication load.

As illustrated in FIG. 1, the printing system includes the host computer 1 and the printer 2. The printing system, however, may have a configuration in which the printing system is connected to other host computers or to other printers through, for example, a local area network (LAN).

The host computer 1 serves as a host apparatus of the printer 2 and transfers print data to the printer 2 to thereby make a print request. The host computer 1 possesses functions, for example, of a driver 11 and of a status monitoring section 13 as illustrated in FIG. 1.

The driver 11 serves as a driver of the printer 2. Upon receiving a print instruction sent by, for example, an application (not illustrated), the driver 11 generates print data based on the instruction in a format that the printer 2 can process. The driver 11 transfers the generated print data to the printer 2. It should be noted that the driver 11 may be referred to as a transfer section 11 in this specification.

In addition, the driver 11 includes a monitoring section 12. The monitoring section 12 operates over only a period during which the driver 11 is making the print request to the printer 2, in other words, over only a period during which a print job that the driver 11 is instructed to perform is being processed. The monitoring section 12 performs a process to acquire the status information from the printer 2 at predetermined frequency (first frequency), for example, every 0.1 seconds. This process will hereinafter be referred to as a status acquiring process. In the status acquiring process, the monitoring section 12 transfers a command for requesting the acquisition of the status information to the printer 2 and receives status information sent from the printer 2 in response to the command, where the status information includes information on the states of the printer 2, for example, printing condition, the presence or absence of an error, the presence or absence of a cancellation request, and the states of consumables. The monitoring section 12 saves the received information in a storage section, or a memory, (not illustrated). It should be noted that the monitoring section 12 may be referred to as an acquisition section 12 in this specification.

It should be noted that the driver 11 may include a setting section that is capable of setting at least one of the frequency of the acquisition of the status information of the printer 2 performed by the monitoring section 12 and a period over which the monitoring section 12 acquires the status information of the printer 2. For example, the setting section may be capable of setting the frequency of the acquisition of the status information performed over a period (a first period) from the start of transfer of print data to the end of transfer of the print data to be higher than the frequency of the acquisition of the status information performed over a period (a second period) other than the first period. The setting section may also be capable of setting the monitoring section 12 to acquire the status information over only a period from the start of transfer of the print data to the end of transfer of the print data. It should be noted that the frequency of the acquisition of the status information and the period for the acquisition can be set in various setting manners. For example, a user may manipulate a setup screen displayed on an operation panel 23 to thereby set at least one of the frequency of the acquisition of the status information and the period for the acquisition. Alternatively, the host computer 1 may read a setup file to thereby set at least one of the frequency of the acquisition of the status information and the period for the acquisition.

The driver 11 starts a print job and then starts the monitoring section 12. When the print job ends, the driver 11 stops the monitoring section 12. Furthermore, in a case where status information acquired through the monitoring section 12 includes information indicating that an action for requesting cancellation of the print job has been performed, or information indicating the presence of a request for cancellation, the driver 11 aborts transfer of print data at the end of a piece of data having a predetermined data size, as described above, with respect to the print job that is being processed. Note that the action for requesting cancellation of the print job will hereinafter be referred to as a job cancellation request.

The status monitoring section 13 always performs the status acquiring process with respect to the printer 2 over a period during which the host computer 1 is in operation. The status monitoring section 13 performs the status acquiring process at predetermined frequency (second frequency), for example, every one second to every five seconds, lower than the frequency of the status acquiring process performed by the monitoring section 12 described above. The acquired information is the same as the information acquired by the monitoring section 12.

It should be noted that the host computer 1 may be a personal computer, a tablet computer, or another type of computer. The host computer 1 includes a central processing unit (CPU), random access memory (RAM), read-only memory (ROM), a hard disk drive (HDD), a communication interface, a display, an operation device, and other electronic parts.

In addition, the driver 11, which includes the monitoring section 12, and the status monitoring section 13 each include a program that contains instructions on the processes described above, a CPU that executes the processes in accordance with the program, RAM, a communication interface, and the like. It should be noted that, in the embodiment, the program for the driver 11 is supplied as a driver program for the printer 2. The program for the monitoring section 12 is included in the driver program. Accordingly, the monitoring section 12 starts as an internal process of the driver program. On the other hand, the program for the status monitoring section 13 is supplied separately with the driver program.

It should be noted that the monitoring section 12 may be separate from the driver 11. In other words, the program for the monitoring section 12 may be supplied separately with the program for the driver 11. In this case, the monitoring section 12 may further be integrated with the status monitoring section 13 so that the status monitoring section 13 performs additional functions that correspond to the monitoring section 12. In this case, the status monitoring section 13 performs the status acquiring process at the first frequency over a period during which a print job is being processed and performs the status acquiring process at the second frequency over other periods.

Figure 2:
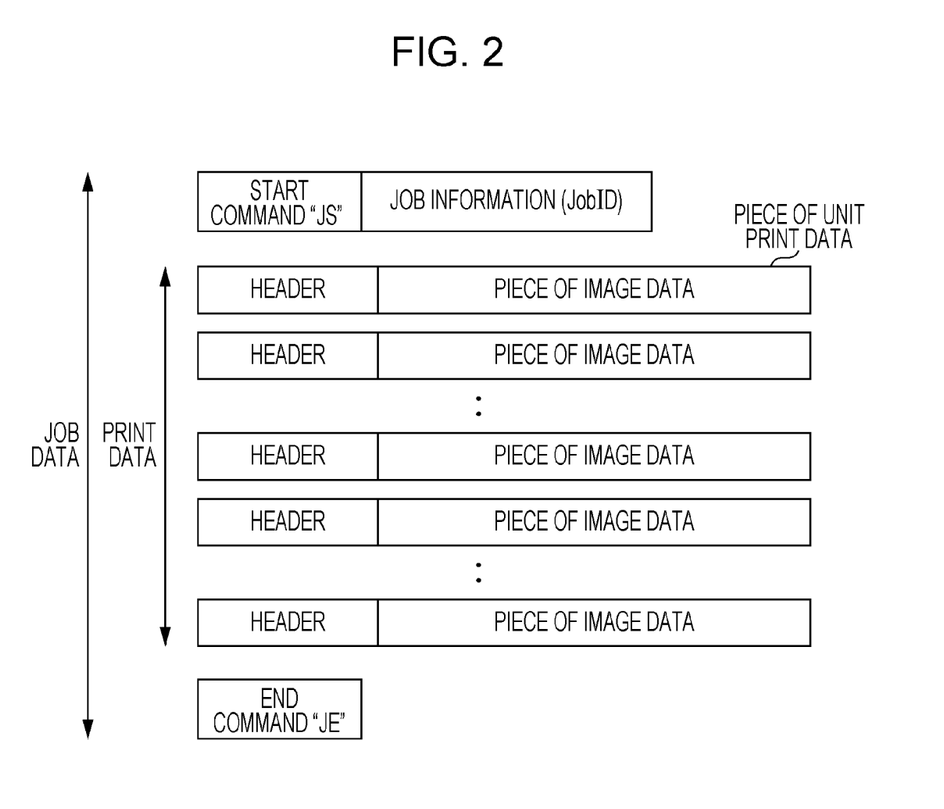
FIG. 2 illustrates an example of the data structure of a single print job.

Next, an explanation will be made on the structure of print data that is transferred from the host computer 1. FIG. 2 illustrates an example of the data structure of a single print job. As illustrated in FIG. 2, data of a single print job, hereinafter, referred to as job data, has a data structure in which the print data is provided between a start command "JS" and an end command "JE". The start command "JS" and the end command "JE" respectively indicate the start of the print job and the end of the print job. It should be noted that job information is attached to the start command "JS". The job information includes a job ID (JobID) that serves as information for identifying the print job. The job ID includes information on, for example, a media access control (MAC) address, which uniquely identifies the host computer 1, and may be composed of, for example, a combination of the MAC address and a sequential number.

The print data serves as data for forming an image to be printed. The print data is divided into a plurality of pieces of data each having a predetermined data size. In this specification, each of the plurality of pieces of data, which is generated by dividing the print data, will be referred to as a piece of unit print data, or a piece of divided data. As illustrated in FIG. 2, the piece of unit print data is formed of a header and a piece of image data that follows the header. The piece of image data may be referred to as a piece of body data. The header provides a description of the piece of unit print data and includes information on the data size of the piece of image data that follows the header. A piece of image data corresponds to a portion of the image to be printed. Note that examples of the piece of unit print data include data corresponding to a piece of paper and data corresponding to a single portion obtained by dividing a piece of paper. It should be noted that the piece of unit print data may be formed of a header and a piece of data, such as a piece of text data, other than a piece of image data.

The printer 2 serves as a printing apparatus configured to perform printing onto a printing medium, such as a piece of paper, in response to a print request sent from, for example, the host computer 1. The printer 2 is, for example, an ink jet printer.

The printer 2 includes, as illustrated in FIG. 1, a controller 21, a printing mechanism 22, the operation panel 23, and other components. The controller 21 serves as a controller configured to control each of the components of the printer 2. The hardware of the controller 21 includes a CPU, RAM, ROM, non-volatile RAM (NVRAM), an application specific integrated circuit (ASIC), and other electronic parts.

The functions of the controller 21 include, for example, a data receiver 211, a received data buffer 213, a command analyzer 214, a picture-image data decompressing section 215, a picture-image data buffer 216, a print job controller 217, and a status-information sending section 218, as illustrated in FIG. 1.

The data receiver 211 receives various data, in other words, various commands, sent from, for example, the host computer 1. The data receiver 211 includes a first-in, first-out memory 212, hereinafter, referred to as a FIFO memory. The data receiver 211 stores the received data in the FIFO memory 212 first. Next, the data receiver 211 transfers print data out of the stored data to the received data buffer 213.

The received data buffer 213 serves as a storage section for storing, or saving, the print data transferred from the data receiver 211.

The command analyzer 214 interprets the data, in other words, the commands, that the data receiver 211 receives. In addition, the command analyzer 214 sequentially reads and interprets the print data stored in the received data buffer 213. The interpretation results are sent to the print job controller 217. It should be noted that the command analyzer 214 may be referred to as an analyzer 214 in this specification.

In a case where data stored in the received data buffer 213 corresponds to print data, the picture-image data decompressing section 215 decompresses a piece of image data contained in the stored data. In other words, the picture-image data decompressing section 215 generates a set of data defined on a pixel-by-pixel basis from the piece of image data. Hereinafter, the set of data defined on a pixel-by-pixel basis will be referred to as picture image data.

The picture-image data buffer 216 serves as a storage section for storing, or saving, the decompressed picture image data.

Note that the FIFO memory 212, the received data buffer 213, and the picture-image data buffer 216 are each composed of RAM and the like.

The print job controller 217, or a printing controller, controls all the processes associated with a print job requested by, for example, the host computer 1. In a case in particular where the job cancellation request is made to the printer 2, the print job controller 217 controls the cancellation process. Note that the processes that the print job controller 217 performs are executed by a program, or firmware stored in, for example, ROM, a CPU that operates in accordance with the program, RAM, an ASIC, and the like.

In reply to a request from the monitoring section 12 or the status monitoring section 13, which are included in the host computer 1, the status-information sending section 218 sends the status information of the printer 2 to the monitoring section 12 or the status monitoring section 13.

The printing mechanism 22 performs printing onto the printing medium, such as a piece of paper, in accordance with instructions given by the print job controller 217. The printing mechanism 22 includes print heads, a transportation device for the printing medium, and other components.

The operation panel 23 serves as a user interface of the printer 2 and includes an operation button, a monitor display, and other components. The job cancellation request is made to the operation panel 23. It should be noted that the operation panel 23 may be referred to as an operation section 23 in this specification.

In the printing system according to the embodiment, the system of which includes the configurations described above, processes that are to be performed in a case where the job cancellation request is made have distinctive features. Specific contents of the processes will hereinafter be described. The following description will be focused on the distinctive features.

Figure 3:
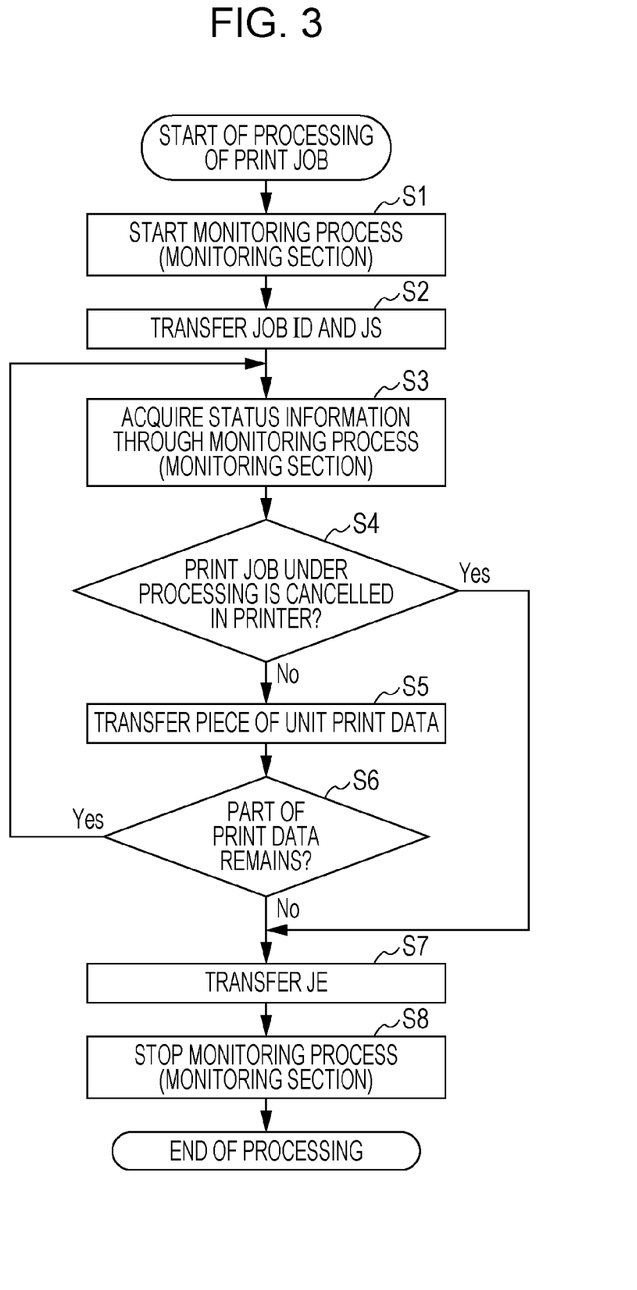
FIG. 3 is a flow chart illustrating an example of a processing procedure performed by a driver.

First, processes performed on the host computer 1 will be described. FIG. 3 is a flow chart illustrating an example of a processing procedure performed by the driver 11. Upon receiving a print instruction from, for example, an application, the driver 11 starts to process a print job associated with the print instruction. First, the driver 11 starts the monitoring section 12 (step S1 in FIG. 3). Then, the monitoring section 12 repeatedly performs a status acquiring process at first frequency. Status information that is acquired is saved in a predetermined area of a memory. At this time, previous status information is updated.

Next, the driver 11 transfers the start command "JS" of the print job to the printer 2 with the job ID of the print job attached to the start command "JS" (step S2 in FIG. 3).

Next, the driver 11 acquires the status information acquired by the monitoring section 12, i.e., a monitoring process (step S3 in FIG. 3). Specifically, the driver 11 accesses the predetermined area of the memory to read the status information (the latest status information), which is kept at this time.

The driver 11 interprets the acquired status information to determine whether or not the print job that is being processed has been cancelled in the printer 2 (step S4 in FIG. 3). Specifically, in a case where a job cancellation request has been made in the printer 2, the status information includes both cancellation information that indicates the presence of the job cancellation request and the job ID of a cancelled print job. Accordingly, if the cancellation information is present with respect to the job ID of the print job that is being processed, the driver 11 determines that the print job has been cancelled. If not, the driver 11 determines that the print job has not been cancelled.

In a case where, as a result, the print job is determined to have not been cancelled ("No" in step S4 in FIG. 3), the driver 11 generates the next piece of unit print data of the print job and transfers the generated piece of unit print data to the printer 2 (step S5 in FIG. 3).

Next, the driver 11 determines whether or not some part of print data associated with the print job remains (step S6 in FIG. 3). In other words, the driver 11 determines if all the print data associated with the print job has already been transferred to the printer 2. In a case where some part of the print data remains ("Yes" in step S6 in FIG. 3), the processing proceeds to step S3. Then, the processes starting from step S3 are performed in the same way.

On the other hand, in a case where no part of the print data remains ("No" in step S6 in FIG. 3), the processing proceeds to step S7.

Alternatively, in a case where, after the processing returns to step S4, the print job is determined to have been cancelled ("Yes" in step S4 in FIG. 3), the processing proceeds to step S7.

In step S7, the driver 11 transfers the end command "JE" of the print job to the printer 2.

Since the process performed in step S7 brings the processing of the print job to an end, the driver 11 stops the monitoring section 12 (step S8 in FIG. 3).

In this way, the processing of the single print job performed by the driver 11 ends. As described above, after the driver 11 receives the cancellation information from the printer 2 with respect to the print job that is being processed, the driver 11 transfers the end command "JE" of the print job instead of transferring the print data, thereby bringing the print job to an end. Even in this case, performing the processes described above results in the print data transferred to the printer 2 being formed of a group of pieces of unit print data. No piece of unit print data is transferred with the end portion thereof lost. Accordingly, in every piece of unit print data that has been transferred, a piece of image data having a data size indicated in a corresponding header is attached to the end of the corresponding header.

Figure 4A:
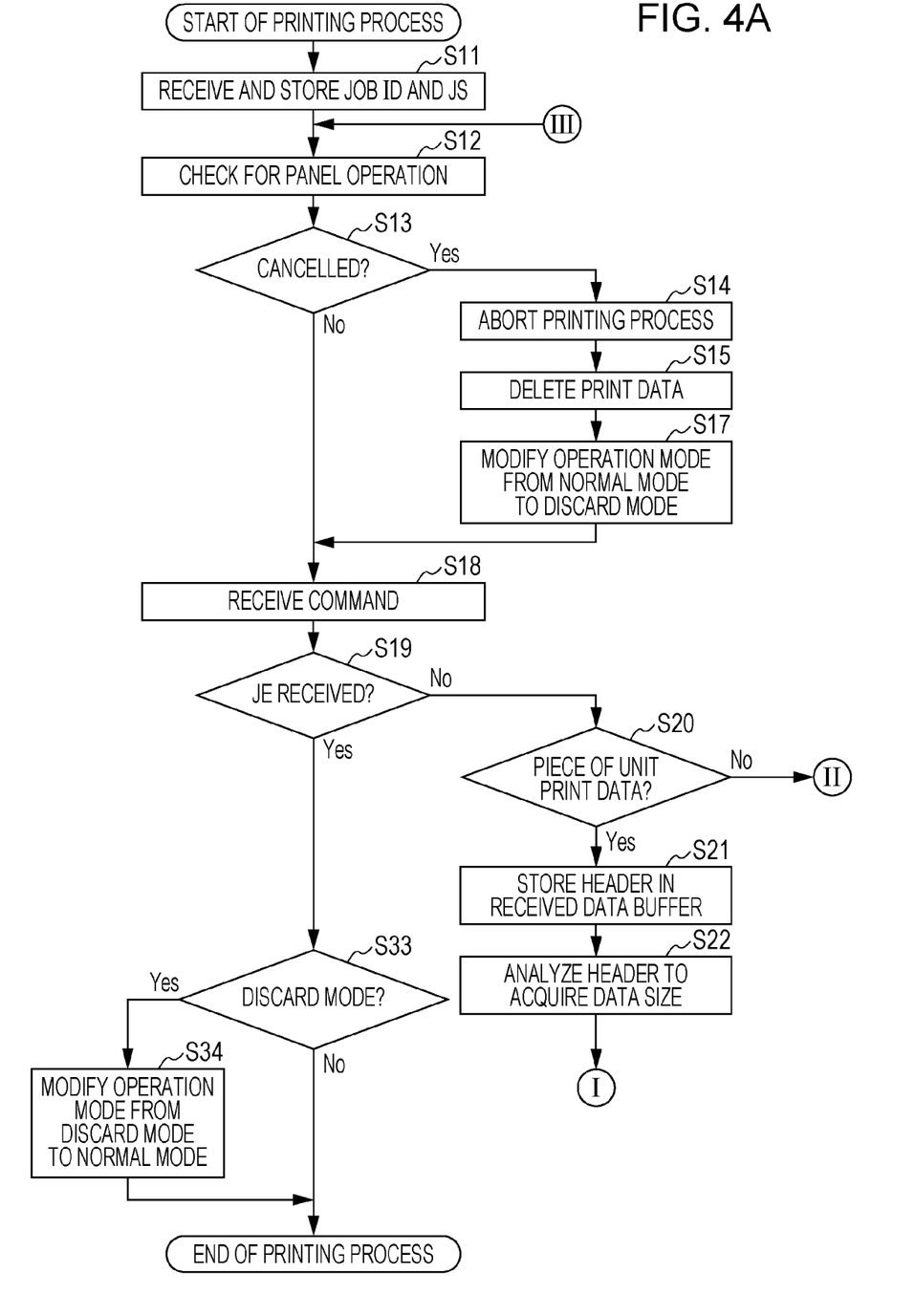
FIGS. 4A and 4B provide a flow chart illustrating an example of a processing procedure performed by a controller.
Figure 4B:
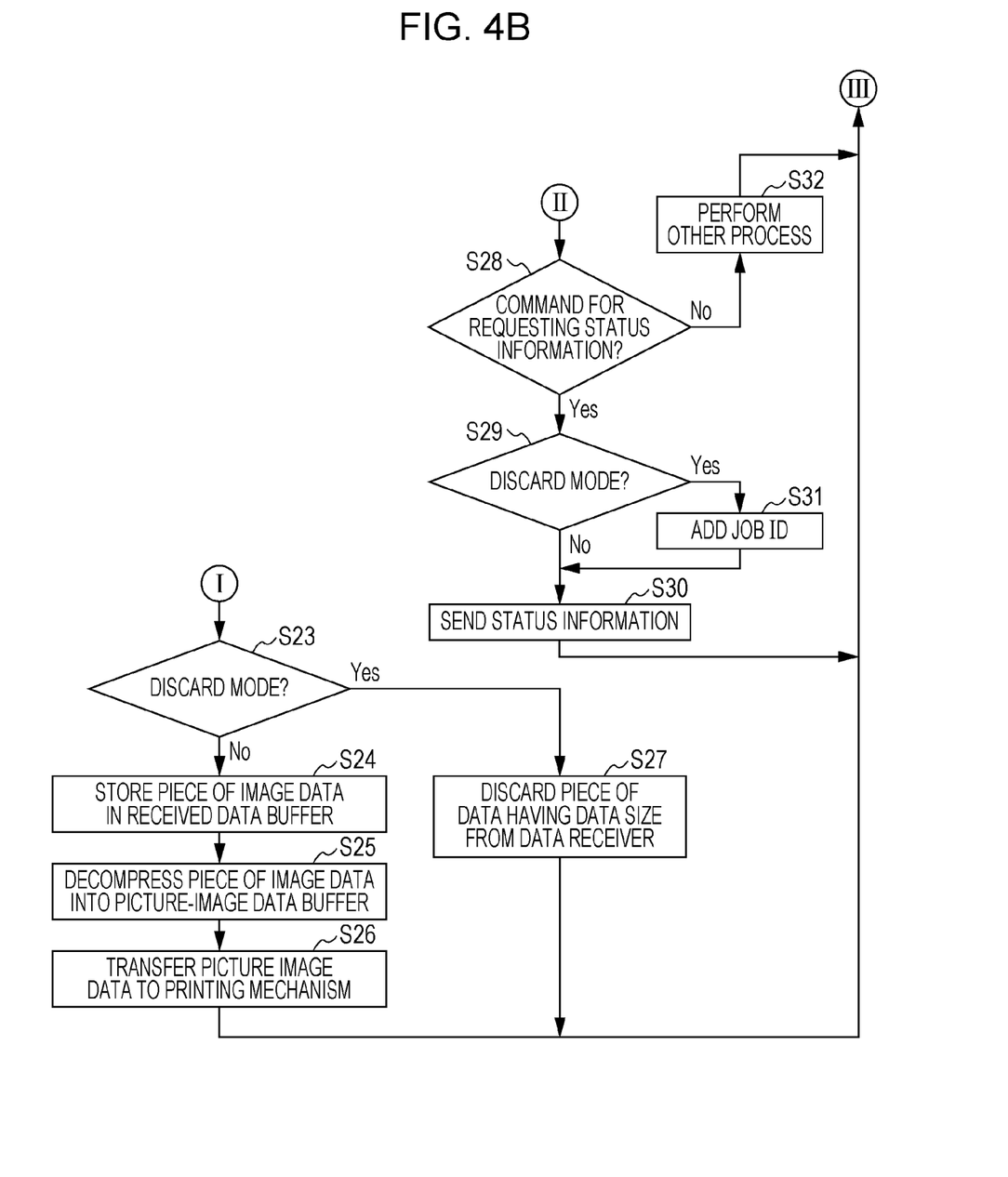

Next, processes performed in the printer 2 will be described. FIGS. 4A and 4B provide a flow chart illustrating an example of a processing procedure performed by the controller 21. In a printing process performed in the printer 2, first of all, the data receiver 211 receives the start command "JS" of a print job sent from the host computer 1 and the job ID of the print job attached to the start command "JS". The print job controller 217 stores the received job ID in a memory (step S11 in FIG. 4A).

Next, the print job controller 217 checks for the presence of an operation that a user may have performed on the operation panel 23 (step S12 in FIG. 4A). Then, the print job controller 217 determines whether or not a job cancellation request has been made (step S13 in FIG. 4A).

In a case where the determination result indicates the absence of the job cancellation request ("No" in step S13 in FIG. 4A), the processing proceeds to step S18.

On the other hand, in a case where the job cancellation request has been made ("Yes" in step S13 in FIG. 4A), the print job controller 217 instructs the printing mechanism 22 to abort the printing process associated with the print job that is currently being processed (step S14 in FIG. 4A). Furthermore, the print job controller 217 deletes (i.e., erases) both print data that the printer 2 has already received from the host computer 1 with respect to the print job and picture image data generated by decompressing the print data (step S15 in FIG. 4A). Specifically, the print job controller 217 erases both the print data stored in the received data buffer 213 and the picture image data stored in the picture-image data buffer 216. It should be noted that the print job controller 217 may be referred to as an erasing section 217 in this specification.

Next, the print job controller 217 modifies (i.e., changes) the operation mode of the print job controller 217 from a normal mode to a discard mode (step S17 in FIG. 4A).

Here, the term "normal mode" refers to a mode in which the print job controller 217 stores all the print data transferred from the host computer 1 in the received data buffer 213 first. The discard mode is a special mode for the case where the job cancellation request is present. The term "discard mode" refers to a mode in which the print job controller 217 erases (i.e., deletes) the print data, specifically, the pieces of image data, of the cancelled print job without storing the print data in the received data buffer 213. Next, the processing proceeds to step S18.

In step S18, the printer 2 receives the next command. The received command is transferred to the command analyzer 214 through the data receiver 211 and is interpreted by the command analyzer 214. In a case where the interpretation result indicates that the received command is not the end command "JE" of the print job ("No" in step S19 in FIG. 4A), the print job controller 217 determines whether or not the received command corresponds to a piece of unit print data (step S20 in FIG. 4A).

In a case where the determination result indicates that the received command corresponds to a piece of unit print data ("Yes" in step S20 in FIG. 4A), the print job controller 217 stores the header of the piece of unit print data in the received data buffer 213 (step S21 in FIG. 4A). Then, the print job controller 217 causes the command analyzer 214 to analyze the header, thereby acquiring (i.e., obtaining) the data size of a piece of image data that follows the header (step S22 in FIG. 4A).

Next, the print job controller 217 determines whether or not the discard mode is active at this time (step S23 in FIG. 4B). In a case where the discard mode is not active ("No" in step S23 in FIG. 4B), in other words, in a case where the normal mode is active, the print job controller 217 stores the piece of image data, which follows the header, in the received data buffer 213 (step S24 in FIG. 4B).

Next, the print job controller 217 causes the picture-image data decompressing section 215 to decompress the stored piece of image data (step S25 in FIG. 4B). The decompressed picture image data is stored in the picture-image data buffer 216.

Next, the print job controller 217 transfers the picture image data to the printing mechanism 22 (step S26 in FIG. 4B), thereby causing the printing mechanism 22 to perform a printing process based on the picture image data. Next, the processing proceeds to step S12.

On the other hand, in a case where, in step S23, the discard mode is active ("Yes" in step S23 in FIG. 4B), the print job controller 217 discards a piece of data having the data size, which is obtained as described above, from the FIFO memory 212 without storing the piece of data in the received data buffer 213, the piece of data having been received by the data receiver 211 subsequent to the reception of the header (step S27 in FIG. 4B). In other words, the print job controller 217 erases the piece of data, namely that the piece of image data attached to the header is deleted. As described above, the host computer 1 transfers pieces of image data each of which has a data size indicated in a corresponding header, independently of whether or not the job cancellation request has been made. Accordingly, this process does not result in erroneous deletion of the next command. Next, the processing proceeds to step S12.

Next, the processing returns to step S20. In a case where a received command, in other words, received data, is determined not to correspond to a piece of unit print data ("No" in step S20 in FIG. 4A), the print job controller 217 determines whether or not the received command is a command for requesting the status information (step S28 in FIG. 4B).

In a case where the determination result indicates that the received command is a command for requesting the status information ("Yes" in step S28 in FIG. 4B), the print job controller 217 causes, provided that the discard mode is not active at this time ("No" in step S29 in FIG. 4B), the status-information sending section 218 to send status information to the host computer 1 (step S30 in FIG. 4B). On the other hand, in a case where the discard mode is active at this time ("Yes" in step S29 in FIG. 4B), the print job controller 217 causes the status-information sending section 218 to send the host computer 1 status information to which the job ID stored in step S11 is added (steps S30 and S31 in FIG. 4B).

It should be noted that in a case where the discard mode is not active, status information includes information that indicates the absence of the job cancellation request, but in a case where the discard mode is active, the status information includes information that indicates the presence of the job cancellation request. Next, the processing proceeds to step S12.

On the other hand, in a case where, in step S28, the received command is not the command for requesting the status information ("No" in step S28 in FIG. 4B), the print job controller 217 causes a process corresponding to the command to be performed (step S32 in FIG. 4B). Next, the processing proceeds to step S12.

The processing is performed repeatedly as described above. In a case where a command received from the host computer 1 is the end command "JE" of the print job ("Yes" in step S19 in FIG. 4A), the print job controller 217 brings the processing of the print job to an end. Note that, in a case where the discard mode is active at this time ("Yes" in step S33 in FIG. 4A), the print job controller 217 modifies (i.e., changes) the operation mode of the print job controller 217 from the discard mode to the normal mode (step S34 in FIG. 4A) and then brings the processing of the print job to an end.

As described above, the printing system according to the embodiment has the following two distinctive features. The first feature is as follows: in the host computer 1, the status information of the printer 2 is acquired at higher frequency over the period during which the print job is being processed; and in a case where the status information includes the cancellation information, the host computer 1 aborts transfer of the print data. The second feature is as follows: in the printer 2, once the job cancellation request is made, the printer 2 erases print data, specifically, pieces of image data, from the FIFO memory 212, the print data being transferred from the host computer 1 after the job cancellation request is made.

The following are the results of estimations of the extent to which the features described above can shorten a period of time required by the cancellation process performed in the printer 2. The estimations were based on the following assumptions: a rate of data transfer from the host computer 1 to the printer 2 is 100 MB/sec; a rate of writing to the received data buffer 213 of the printer 2 is 500 MB/sec; intervals of monitoring, or intervals of the status acquiring processes, performed by the monitoring section 12 at the first frequency are 0.5 seconds; and a job cancellation request is made at the time of processing page 50 of a 100-page print job that contains print data, or image data, in which an average data amount per page is 10 MB.

In this case, periods of time required by different cancellation processes, in other words, processing times of print data transferred from the host computer 1 after the job cancellation request is made, were as follows: five seconds in a case where neither the first feature nor the second feature was performed; one second in a case where only the second feature was performed; 0.6 seconds in a case where only the first feature was performed; and 0.2 seconds in a case where both the first feature and the second feature were performed. As described above, it is confirmed that the printing system according to the embodiment can shorten the cancellation processing time.

Incidentally, the description of the embodiment described above assumes a state where communication between the host computer 1 and the printer 2 is working in a normal way. In a case, however, where the communication is cut off immediately after a job cancellation request is made, for example, in a case where the end of a LAN cable on the host computer 1 side is disconnected immediately after a job cancellation request is made, it is preferable to change the processing in such a manner that all the data received by the printer 2 is stored in the received data buffer 213 first without a process related to the second feature being performed and that all the data is processed after being interpreted by the command analyzer 214. The print data of a cancelled print job is erased on the basis of the interpretation results.

As an example, suppose that the printer 2 is further connected to another host computer and that cutting off the communication interrupts data transfer from the host computer 1 at a position of a piece of unit print data before the end of the piece of unit print data. In this case, a piece of image data that has a data size indicated in a corresponding header is not transferred. Accordingly, performing the process related to the second feature is likely to result in erroneous erasure of a command (in other words, data) that has been transferred from the other host computer and that is not a target of the job cancellation request.

As a further example, suppose that the end of a LAN cable on the host computer 1 side is disconnected and thereafter immediately reinserted. Also in this case, a piece of image data that has a data size indicated in a corresponding header may not be transferred in some case. Accordingly, in this case, performing the process related to the second feature is likely to result in erroneous erasure of the command (in other words, the data) of a subsequent print job.

As described above, in any printing system according to the embodiments or the modified examples, the host computer 1 causes the monitoring section 12 to operate over a period during which a print job is being processed and acquires the status information of the printer 2 at higher frequency. Accordingly, the host computer 1 is capable of promptly detecting that a job cancellation request has been made in the printer 2. The host computer 1 is further capable of promptly aborting transfer of the print data of a cancelled print job. The feature described above reduces the amount of data to be erased in the printer 2, thereby shortening the cancellation processing time. In addition, the status acquiring process is performed at lower frequency over a period other than the period during which the print job is being processed. Accordingly, a communication load can be restrained.

In addition, the status information acquired by the monitoring section 12 includes both information that indicates the presence of the job cancellation request and a job ID that is a target of the job cancellation request. Accordingly, the host computer 1 is capable of correctly detecting that the job cancellation request has been made.

In addition, the host computer 1 aborts the data transfer at the end of one of pieces of unit print data in the event of job cancellation, allowing the printer 2 to perform a process related to the second feature.

Accordingly, with respect to print data that is transferred from the host computer 1 after the job cancellation request is made, the printer 2 analyzes headers only. In addition, with respect to pieces of data (specifically, pieces of image data) that follow respective headers and that have data sizes indicated in the respective headers, the printer 2 is capable of erasing the pieces of data from the FIFO memory 212 of the data receiver 211 without storing the pieces of data in the received data buffer 213 nor interpreting the pieces of data. This feature described above can shorten the cancellation processing time.

In addition, as described above, in a case where communication is cut off immediately after the job cancellation request is made, the processing is changed to a processing method with which data received after the job cancellation request is made is stored in the received data buffer 213, after which the data is interpreted. This change prevents erroneous erasure of data, or a command, that is not a target of the cancellation.

It should be noted that one of the CPUs in this specification may include one of at least one CPU and at least one integrated circuit such as an ASIC. In addition, one of the CPUs may include a combination of at least one CPU and at least one integrated circuit.

The scope of protection of the invention should not be limited to the embodiments described above and covers the invention described in the appended claims and equivalents of the invention as well.

The entire disclosure of Japanese Patent Application No. 2017-127043, filed Jun. 29, 2017 is expressly incorporated by reference herein.

What is claimed is:

1. An information processing apparatus comprising:
a transfer section configured to transfer print data of a print job to a printing apparatus, the print data including a plurality of unit data;
an acquisition section configured to query the printing apparatus to acquire status information of the printing apparatus, the acquisition section being further configured to acquire the status information over a first period from a start of transfer of the print data to an end of transfer of the print data; and
a status monitoring section configured query the printing apparatus to acquire status information of the printing apparatus separately from the acquisition section,
wherein the acquisition section transfers a command to acquire the status information from the printing apparatus and receives the status information in response to the command,
wherein a frequency of the acquisition of the status information by the acquisition section performed over the first period from the start of transfer of the print data to the end of transfer of the print data is higher than a frequency of the acquisition of the status information performed over a second period other than the first period and a frequency of the acquisition of the status information by the status monitoring section,
wherein the transfer of the print data is stopped after transmitting a unit data that is being transmitted when the status information received from the printing apparatus includes a cancellation request to cancel the print job.

2. The information processing apparatus according to claim 1,
wherein the acquisition section is further configured to acquire the status information over only the first period from the start of transfer of the print data to the end of transfer of the print data.

3. The information processing apparatus according to claim 1,
wherein the status information includes information on whether or not a job cancellation request is present, and in a case where the status information includes information that indicates a presence of the job cancellation request, the status information further includes information for identifying the print job that is a target of the job cancellation request.

4. The information processing apparatus according to claim 3,
wherein the transfer section is further configured to abort the transfer of the print data at an end of a predetermined piece of data in a case where status information acquired by the acquisition section includes the information that indicates the presence of the job cancellation request.

5. The information processing apparatus according to claim 2,
wherein the print data includes a piece of unit data, the piece of unit data including a header and a piece of subsequent data that follows the header, the header including information on a data size of the piece of subsequent data, and
wherein the transfer section is further configured to abort the transfer of the print data at an end of the piece of unit data in a case where status information acquired by the acquisition section includes information that indicates a presence of a job cancellation request.

6. A non-transitory computer-readable storage medium storing a program that causes an information processing apparatus to function as a transfer section, an acquisition section, and as a status monitoring section,
wherein the information processing apparatus is configured to cause a printer to perform a print job, the transfer section is configured to transfer print data of a print job to a printing apparatus, the acquisition section is configured to query the printing apparatus to acquire status information of the printing apparatus, wherein the acquisition section is further configured to acquire the status information over a first period from a start of transfer of the print data to an end of transfer of the print data, and wherein the status monitoring section is configured query the printing apparatus to acquire the status information of the printing apparatus separately from the acquisition section and at a different frequency than the acquisition section, wherein the print job includes a plurality of unit data and wherein the transfer of the print data is stopped after transmitting a unit data that is currently being transmitted when the status information received from the printing apparatus includes a cancellation request to cancel the print job.

7. The non-transitory computer-readable storage medium according to claim 6, wherein the program causes the information processing apparatus to further function as a setting section that is capable of setting frequency of the acquisition of the status information performed by the acquisition section, the setting section being further configured to be capable of setting frequency of the acquisition of the status information performed over the first period from the start of transfer of the print data to the end of transfer of the print data to be higher than frequency of the acquisition of the status information performed over a second period other than the first period.

8. The non-transitory computer-readable storage medium according to claim 6, wherein the program causes the information processing apparatus to further function as a setting section that is capable of setting a period over which the acquisition section acquires the status information, the setting section being further configured to be capable of setting the acquisition section to acquire the status information over only the first period from the start of transfer of the print data to the end of transfer of the print data.

* * * * *